US 8,090,805 B1

(12) United States Patent
Chawla et al.

(10) Patent No.: US 8,090,805 B1
(45) Date of Patent: Jan. 3, 2012

(54) SYSTEM AND METHOD FOR PERFORMING CASCADED LOOKUPS TO FORWARD PACKETS

(75) Inventors: Mukul Chawla, San Jose, CA (US); Chickayya G. Naik, San Jose, CA (US); Jason A. Marinshaw, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 2159 days.

(21) Appl. No.: 10/780,022

(22) Filed: Feb. 17, 2004

(51) Int. Cl.
*G06F 15/177* (2006.01)
*G06F 15/173* (2006.01)

(52) U.S. Cl. .................................. 709/221; 709/240
(58) Field of Classification Search .................. 709/221, 709/220
See application file for complete search history.

(56) References Cited

U.S. PATENT DOCUMENTS

| | | | | |
|---|---|---|---|---|
| 6,278,709 B1* | 8/2001 | Walker et al. | | 370/392 |
| 6,618,760 B1* | 9/2003 | Aramaki et al. | | 709/240 |
| 6,778,546 B1* | 8/2004 | Epps et al. | | 370/413 |
| 6,839,794 B1* | 1/2005 | Schober | | 710/316 |
| 6,977,930 B1* | 12/2005 | Epps et al. | | 370/392 |
| 7,466,703 B1* | 12/2008 | Arunachalam et al. | | 370/392 |
| 2001/0040895 A1* | 11/2001 | Templin | | 370/466 |
| 2002/0118682 A1* | 8/2002 | Choe | | 370/395.31 |
| 2002/0194362 A1* | 12/2002 | Rawlins et al. | | 709/235 |
| 2003/0079040 A1 | 4/2003 | Jain et al. | | 709/238 |
| 2003/0223402 A1* | 12/2003 | Sanchez et al. | | 370/351 |
| 2007/0008884 A1* | 1/2007 | Tang | | 370/230 |

OTHER PUBLICATIONS

"PIM-SM Multicast Routing Protocol," Microsoft Windows 2000 Server, © 1999 Microsoft Corporation, pp. 1-34.

* cited by examiner

*Primary Examiner* — Kenny Lin
*Assistant Examiner* — Gerald Smarth
(74) *Attorney, Agent, or Firm* — Campbell Stephenson LLP

(57) ABSTRACT

Cascading a lookup over multiple lookup tables when performing multicast forwarding involves accessing a first lookup table based on at least part of a multicast destination address included in a packet header. The first lookup table identifies the portion (e.g., one or more entries) of a second lookup table in response to a key generated from a first portion of the packet header. The portion of the second lookup table can be accessed based on a second portion of the packet header. The second lookup table identifies at least one output interface via which the packet should be output. Such systems and methods may, in some embodiments, allow existing hardware to be used to support a new addressing format that involves larger addresses than were previously supported by that hardware.

55 Claims, 9 Drawing Sheets

| 127 | | 119 | 115 | 111 | 0 |
|---|---|---|---|---|---|
| 1 1 1 1 1 1 1 1 (8 bits) 102 | | Flags (4 bits) 104 | Scope (4 bits) 106 | Multicast Group ID (112 bits) 108 | |

IPV6 Multicast Address
100

FIG. 1A

| FP (n bits) 112 | Routing Prefix (m bits) 114 | Subnet ID (n bits) 116 | Interface ID ((128 - m - n) bits) 118 |
|---|---|---|---|

IPV6 Global Unicast Address
110

FIG. 1B

| 1111111010 (10 bits) 122 | 0 (54 bits) 124 | Interface ID (64 bits) 126 |
|---|---|---|

IPV6 Link-Local Unicast Address
120

FIG. 1C

| 1111111011 (10 bits) 132 | 0 (38 bits) 134 | Subnet ID (16 bits) 136 | Interface ID (64 bits) 128 |
|---|---|---|---|

IPV6 Site-Local Unicast Address
130

FIG. 1D

| IPv6 SA | IPv6 DA | Virtual Forwarding Table |
|---|---|---|
| Global | Global | Global |
| Site-local | Site-local | Site-local (All oifs in site-local zone of iif) |
| Link-local | Link-local | Link-local (All oifs in link-local zone of iif) |
| Global | Site-local | Site-local (All oifs in site-local zone of iif) |
| Global | Link-local | Link-local (All oifs in link-local zone of iif) |
| Site-local | Link-local | Link-local (All oifs in link-local zone of iif) |
| Site-local | Global | Global (Only forward to oifs in site-local zone of iif) |
| Link-local | Global | Global (Only forward to oifs in link-local zone of iif) |
| Link-local | Site-local | Site-Local (Only forward to oifs in link-local zone of iif) |

SYSTEM AND METHOD FOR PERFORMING CASCADED LOOKUPS TO FORWARD PACKETS

FIELD OF THE INVENTION

The present invention relates to networking and, more specifically, to network devices that perform IP (Internet Protocol) multicast forwarding.

BACKGROUND

Many network devices, such as routers and switches, include hardware lookup tables for use when routing or forwarding packets. These hardware lookup tables include many entries, each of which includes a key. Each entry points to or includes information used to route or forward a packet. Typically, all or part of the packet's destination address is included in a key that is provided to the lookup table. If the key provided to the lookup table matches the key in one of the lookup table entries, the information pointed to or included in that entry is used to route or forward the packet.

Since a key typically includes all or part of at least one address (e.g., the destination address), the size of each lookup table is often related to the current address size. With the introduction of IPv6 (Internet Protocol version 6), IP (Internet Protocol) addresses have expanded to 128 bits in size (in contrast, IPv4 addresses were 32 bits long). Accordingly, if a key includes all of the source address and is not compressed or otherwise reduced in size (e.g., by applying a hashing algorithm to the source address), each lookup table entry will be at least 128 bits in size. Some multicast lookups require both the source and destination addresses to be included in the key, and thus keys for IPv6 multicast lookups are likely to include at least 256 bits.

Since lookup tables can be relatively expensive resources, lookup tables are not typically designed to include extra space in the form of unused bits. Thus, lookup tables are likely to be limited in terms of the size of keys they can handle. Each time address size changes, lookup tables will have to be redesigned and/or resized in order to be able to handle the larger keys associated with the new address size. The transition from IPv4 to IPv6 illustrates this problem—many lookup tables designed to handle 32-bit addresses will not be useable when handling 128-bit addresses. A similar problem presents itself when handling multicast lookups, which can double the size of lookup keys. As a result of the increased key size, a lookup table that can be used to forward unicast packets is unlikely to be able to support multicast lookups.

Redesigning lookup tables can undesirably slow down the time to market of new networking devices that are designed to support a new address size and/or to provide multicast capabilities. Accordingly, it is desirable to be able to develop techniques that use existing lookup tables to provide support for a new address size and/or multicast capabilities.

SUMMARY

Various embodiments of systems and methods for cascading a lookup over multiple lookup tables when performing multicast forwarding are disclosed. Cascading the lookup over multiple lookup tables involves accessing a first lookup table based on a first portion of a packet header included in a packet. The first lookup table identifies the portion (e.g., one or more entries) of a second lookup table in response to a key generated from the first portion of the packet header. The cascaded lookup can also involve access the portion of the second lookup table based on a second portion of the packet header. The second lookup table can identify at least one output interface via which the packet should be output. Such systems and methods may, in some embodiments, allow existing hardware to be used to support a new addressing format that involves larger addresses than were previously supported by that hardware.

In some embodiments, a method involves: accessing a first lookup table based on a first portion of a packet header, where the first lookup table identifies a portion (which includes at least one entry) of a second lookup table; and accessing the portion of the second lookup table based on a second portion of the packet header. In some situations, the second lookup table identifies at least one output interface via which a packet comprising the packet header should be output.

The portion of the second lookup table (identified by the first lookup table) can correspond to one of several possible scopes. For example, if a scope of a destination address included in the packet header is link-local, the first lookup table can identify a portion of the second lookup table that corresponds to a link-local scope. Similarly, if the scope of the destination address comprised in the packet header is site-local, the identified portion of the second lookup table corresponds to a site-local scope; and if the scope of the destination address comprised in the packet header is global, the identified portion of the second lookup table corresponds to a global scope. In at least some embodiments, if a scope of the source address in the packet header is less than the scope of the destination address, each entry included in the identified portion of the second lookup table identifies only output interfaces associated with a zone that has the same scope as the source address.

The packet header can include a multicast destination address in some embodiments. In such an embodiment, the portion of the second lookup table (identified by the first lookup table) corresponds to a shortest-path multicast tree if a match for the source address is found in the first lookup table. If no match for the source address is found in the first lookup table, the identified portion of the second lookup table corresponds to a shared multicast tree.

In some embodiments, the first lookup table identifies the portion of the second lookup table by identifying a mask. A key generated by using the mask will only match entries in the identified portion of the second lookup table. In one embodiment, such a key is generated by applying the mask to a multicast destination address (from the packet header) and an interface ID, where the interface ID identifies an input interface that received the packet comprising the packet header. If the source address in the packet header has a non-global scope, the mask can also select the portion of the source address that identifies a scope of the source address. If the source address has a global scope, the mask may not select any of the source address. If accessing the first lookup table matches an entry that corresponds to a shortest-path multicast tree, the mask selects all of the source address. A hash can be generated from the portions of the second address after the mask has been applied to those portions, and this hash can then be used as the key provided to the second lookup table.

In some embodiments, the destination address in the packet header is an IPv6 multicast destination address. In such an embodiment, the first lookup table can also be used to identify access control rules and quality of service levels to use when forwarding unicast packets. Similarly, the second lookup table can be used to identify a state of a network flow for a unicast packet. When a packet addressed to an IPv6 unicast destination address if forwarded, a third lookup table can be used. The width of each entry in the third lookup table is less than a width of a key that includes both an IPv6 destination address and an IPv6 source address (in other words, the third lookup table could not be used to perform an IPv6 multicast lookup).

In some embodiments, a system includes a first lookup table comprising a plurality of first lookup table entries, a second lookup table comprising a plurality of second lookup table entries, and a lookup restriction unit. The first lookup table is configured to identify first information in response to receiving a first key generated from a first portion of a packet header. The first information identifies a portion of the second lookup table, and the identified portion of the second lookup table includes at least one of the second lookup table entries. The lookup restriction unit is configured to prevent a second key generated from a second portion of the packet header from matching any second lookup table entry that is not comprised in the portion of the second lookup table identified by the first information.

A computer readable medium can include program instructions executable to set up entries in the first and second lookup tables. For example, a computer readable medium can store program instructions executable to: allocate at least one entry in a first lookup table and at least one first entry in a portion of a second lookup table for each multicast tree, the portion of the second lookup table comprising at least one entry; and configure a lookup restriction unit to prevent a lookup in the second lookup table from matching entries not included in the portion of the second lookup table if a corresponding lookup in the first lookup table matches the entry in the first lookup table.

The program instructions can additionally be executable to allocate a single entry in the first lookup table for each shortest-path multicast tree. Similarly, the program instructions can be executable to: allocate a first entry and a second entry in the first lookup table for each shared multicast tree. The first entry matches a source address having a global scope, and the second entry matches a source address having a non-global scope. Several entries are also allocated in the second lookup table for each shared multicast tree. Each of the entries corresponds to a respective one of several scopes, and each of the entries only identifies output interfaces included in a zone of the respective scope.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

FIG. 1A illustrates the format of an IPv6 multicast address.

FIGS. 1B-1D illustrate the format of IPv6 unicast addresses of different scopes.

FIG. 7 shows how the scope of the source address and the multicast group destination address select one of several virtual forwarding tables and/or restrict the set of output interfaces indicated by the selected virtual forwarding table.

Figure 2:
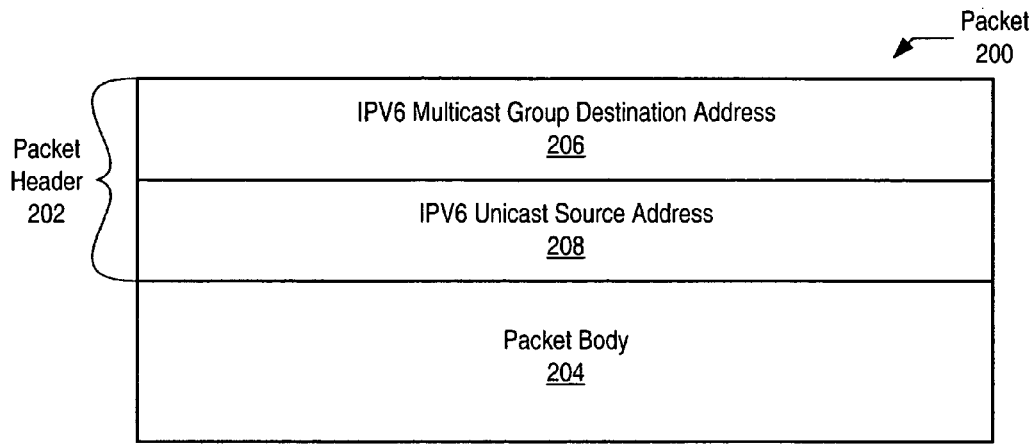
FIG. 2 is a block diagram of a packet that includes a multicast group destination address.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Forwarding a packet involves performing a cascaded lookup using multiple lookup tables. A lookup in a first lookup table selects a subset of a second lookup table. A lookup in the subset of the second lookup table selects information identifying a group of output interfaces to which the packet should be forwarded. By splitting the lookup between multiple tables, the key for each lookup can be smaller that a key needed to perform an equivalent lookup using a single lookup table. Additionally, by using the first lookup to select a subset of the second lookup table into which to perform the second lookup, additional post-lookup filtering of the output interfaces (e.g., to support scoped forwarding rules) can be eliminated.

In some embodiments, lookups such as those described above are performed for IPv6 multicast addresses. FIG. 1A illustrates the format of an IPv6 multicast address. As shown, IPv6 multicast address 100 is 128 bits long. Field 102, which includes the uppermost eight bits, is set to a value 11111111b (FFh) that identifies address 100 as a multicast address. The next field, field 104, includes four bits that are used as flags (e.g., the lowermost bit of the flags can indicate whether the multicast address is transient or permanent). Another field 106 identifies the scope (e.g., site-local, link-local, or global, as described below) of the multicast address. The remaining bits, in field 108, identify a multicast group within a zone having the scope specified by scope field 106.

FIGS. 1B-1D illustrate the format of IPv6 unicast addresses of different scopes. Each scope is a topological span within which an IPv6 address can be used as a unique identifier for one or more interfaces. Unicast addresses can have either a global scope or a local scope. Global-scope addresses are public Internet addresses. Local-scope addresses are private addresses whose use is restricted to a particular link or organization. Local-scope unicast addresses can be link-local or site-local. Link-local addresses are limited to use on a single network link (e.g., a single LAN (Local Area Network)). Site-local addresses are limited to use within a single site or intranet. Scopes are discussed in more detail below with respect to FIGS. 6-9.

FIG. 1B shows the format of global unicast address 110. The first n bits of global unicast address 110 are included in format prefix (FP) 112. Format prefix 112 includes one of several well-known sets of bits. These well-known sets of bits are used to partition the global unicast address space. The particular value of format prefix 112 determines the format of routing prefix field 114, subnet ID field 116, and interface ID field 118.

FIG. 1C shows an IPv6 link-local unicast address 120. This address includes a 10 bit prefix 122, set to the value 1111111010b, which identifies the address as being a link-local address. The next 54 bits, included in field 124, are set to zero. The next 64 bits form an interface ID 126.

FIG. 1D shows an IPv6 site-local unicast address 130. Site-local unicast address 130 includes a 10-bit prefix 132, which is set to the value 1111111011b. This value indicates that address 130 is a site-local address. More details about IPv6 are available in RFC 2460, "Internet Protocol, Version 6 (IPv6) Specification", by S. Deering and R. Hinden, December 1998.

FIG. 2 is a block diagram of a packet that includes a source address and a multicast group destination address. Packet 200 includes packet body 202 and packet header 210. Packet header 210 includes multicast group destination address 214 and source address 212. Multicast group destination address 124 is an IPv6 destination address (e.g., IPv6 multicast group destination address 100, as shown in FIG. 1A) in some embodiments. Similarly, source address 212 is an IPv6 unicast address (e.g., address 110, 120, or 130, as shown in FIGS. 1B-1D) in some embodiments.

Figure 3:
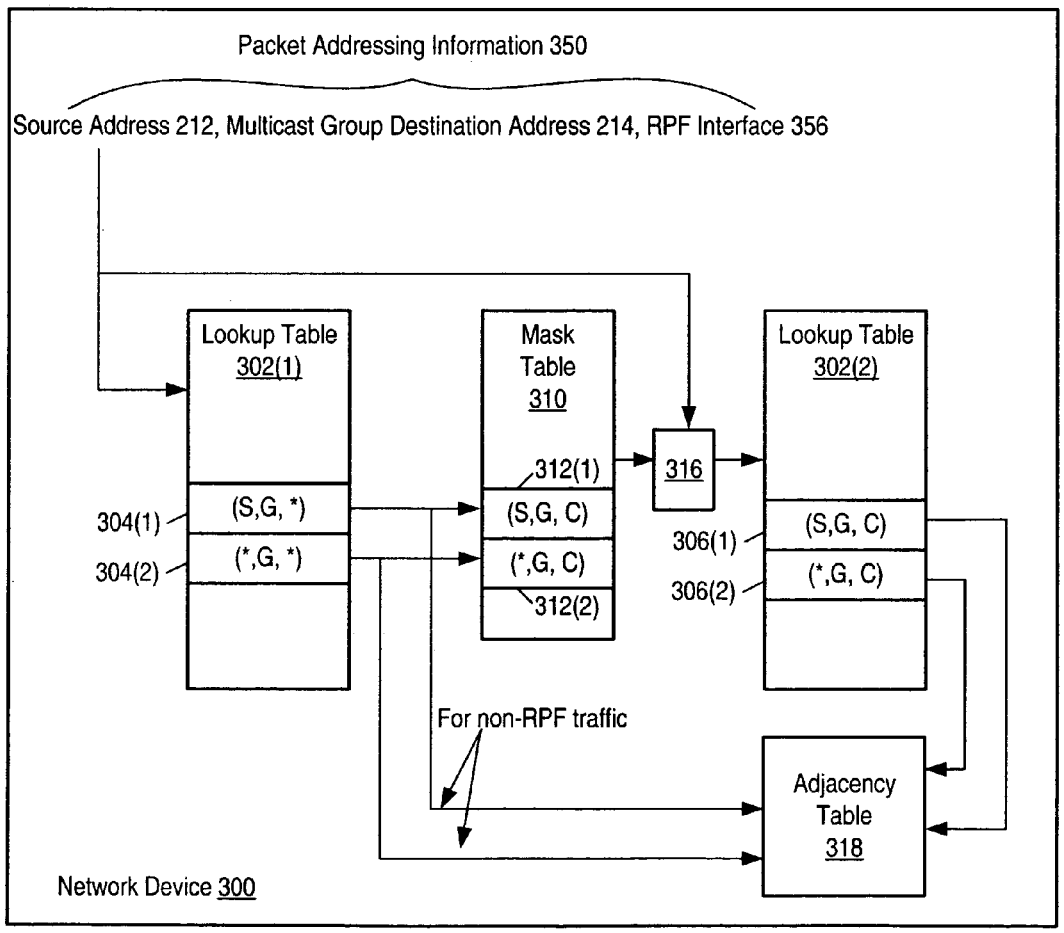
FIG. 3 is a block diagram of a network device that uses a cascaded lookup to forward a packet having an IPv6 multicast destination address, according to one embodiment of the present invention.

FIG. 3 is a block diagram of a network device that uses a cascaded lookup to forward a packet having a multicast group destination address, according to one embodiment of the present invention. Network device 300 includes two lookup tables, lookup table 302(1) and lookup table 302(2), that are used to forward packets having multicast group destination addresses. In other embodiments, similar lookup tables can be used to perform a cascaded lookup when forwarding unicast packets.

Network device 300 uses the PIM (Protocol Independent Multicast) protocol to forward packets. PIM is a protocol that is commonly used when forwarding multicast packets (i.e., packets having a multicast group destination address). There are several variations of PIM, including PIM-SM (Sparse Mode), PIM-DM (Dense Mode), PIM-Bidir, and PIM-SSM (Source Specific Multicast).

In PIM-SM, two types of trees are used to forward multicast packets: shared trees and shortest-path trees. When a shared tree is used, a multicast packet is first forwarded to a special network device, referred to as the rendezvous point network device, associated with the shared tree. The rendezvous point network device then forwards the multicast packet to each destination network device using the shared tree. When a shortest-path tree is used, the packet is forwarded directly from the source of the packet to each destination network device using the shortest-path tree. For a given group of destinations (i.e., a multicast group), a shared tree and one or more shortest-path trees can coexist. A multicast packet will be forwarded using the shortest-path tree, if it exists; otherwise, the multicast packet is forwarded using the shared tree. More details about PIM-SM are available in RFC 2362, "Protocol Independent Multicast-Sparse Mode (PIM-SM): Protocol Specification", by D. Estrin, D. Farinacci, A. Helmy, D. Thaler, S. Deering, M. Handley, V. Jacobson, C. Liu, P. Sharma, and L. Wei, June 1998.

PIM-DM and PIM-SSM are similar to PIM-SM; however, PIM-DM and PIM-SSM only use shortest-path trees (as opposed to using both shortest-path and shared trees). More details about PIM-DM can be found in "Protocol Independent Multicast—Dense Mode (PIM-DM): Protocol Specification (Revised)", Internet Engineering Task Force (IETF) Internet-Draft draft-ietf-pim-dm-new-v2-04.txt, by A. Adams, J. Nicholas, W. Siadak, September 2003. More details about PIM-SSM can be found in RFC 3569, "An Overview of Source-Specific Multicast (SSM)", by S. Bhattacharyya, July 2003. PIM-Bidir uses bidirectional shared trees and does not use shortest-path trees. The bidirectional shared trees are implemented in a similar way to the unidirectional shared trees used in PIM-SM. More details about PIM-Bidir are available in "Bi-directional Protocol Independent Multicast (BIDIR-PIM)", IETF Internet-Draft draft-ietf-pim-bidir-05.txt, by M. Handley, I. Kouvelas, T. Speakman, L. Vicisano, June 2003.

When discussing PIM protocols, the letter 'S' (Source) is used to represent a source (e.g., as identified by source address 212) and the letter 'G' (Group) is used to represent a multicast group (e.g., as identified by multicast group destination address 214). The letter 'C' is used to represent the color of the interface that received the packet. The color is a VLAN (Virtual Local Area Network) ID that identifies which one of several VLANs includes the receiving interface (it is noted that 'C' can represent a VLAN ID other than a color if IDs other than colors are used to differentiate between VLANs). The interface that received the packet is the RPF (Reverse Path Forwarding) interface (e.g., as identified by RPF interface ID 356). For a given packet, the RPF interface (not shown) is an interface included in network device 300, via which network device 300 receives that packet. The source, destination, and RPF interface color are referred to collectively as (S, G, C).

Two entries, entry 304(1) and entry 304(2), are shown in lookup table 302(1). In this example, entry 304(1) corresponds to a shortest-path multicast tree for a particular source S and a particular multicast group G. Shortest-path trees are referred to as (S, G) trees because lookup table entries corresponding to shortest-path trees only match keys generated from multicast packets having both a particular source address and a particular multicast group destination address. Entry 304(2) corresponds to a shared multicast tree for a particular multicast group G. Shared trees are referred to as (*, G) trees, where represents a wildcard, because lookup table entries corresponding to shared trees match any key generated from a multicast packet having a particular multicast group destination address, regardless of value of that packet's source address.

Lookup table 302(1) can be implemented (e.g., using longest prefix matching) such that if it includes both an (S, G) entry and a (*, G) entry for the same multicast group G, any keys that include the same value of the source address as the (S, G) entry will match the (S, G) entry instead of matching the (*, G) entry. It is noted that, at any given time, lookup table 302(1) can include entries corresponding to a number of different multicast groups. Similarly, for the same multicast group, lookup table 302(1) may simultaneously include one or more entries that each correspond to a shortest-path multicast tree and another entry corresponding to a shared multicast tree.

In this example, two entries 306(1) and 306(2) are illustrated in lookup table 302(2). Like entry 304(1) in lookup table 302(1), entry 306(1) corresponds to the shortest-path multicast tree for source S and multicast group M. Similarly, entry 306(2) corresponds to the shared multicast tree for multicast group M, as entry 302(2) in lookup table 302(1). As with lookup table 302(1), lookup table 302(2) may include entries corresponding to a number of different multicast groups at any given time. Additionally, for each different multicast group, lookup table 302(2) can simultaneously include one or more entries corresponding shortest-path multicast trees and/or an entry corresponding to a shared multicast tree.

Network device 300 also includes mask table 310. Mask table 310 stores masks that can be applied to addressing information when generating keys for input to lookup table 302(2). In this example, two entries 312(1) and 312(2) are shown in mask table 312. However, it is noted that mask table 312 may include fewer or additional entries at any given time. Logic 316 is used to apply a selected mask to addressing information used to generate a key for lookup table 302(2).

Entry 312(1) is selected by entries in lookup table 302(1) that correspond to shortest-path multicast trees. For example, entry 304(1), which corresponds to a shortest-path multicast tree, points to entry 312(1). Entry 312(2) is selected by entries in lookup table 302(1) that correspond to shared multicast trees. For example, entry 304(2), which corresponds to the shared multicast tree, points to entry 312(2). It is noted that at any given time, each entry 312(1) and 312(2) in mask table 310 can be selected by multiple entries in lookup table 302(1).

Adjacency table 318 includes one or more entries (not shown) that each identify a set of output interfaces and/or special handling routines to be used when forwarding a packet. The entries in lookup tables 302(1) and 302(2) can each point to an entry in adjacency table 318. For example, in the example of FIG. 3, entries 304(1), 304(2), 306(1), and 306(2) each point to an entry in adjacency table 318.

Network device 300 cascades the lookup to determine how to forward a multicast packet over lookup tables 302(1) and 302(2). Cascading the lookup can allow the lookup to be performed using smaller keys for each individual lookup than would be possible if a single lookup were used. While the example of FIG. 3 uses two lookup tables when forwarding multicast packets, other embodiments can use more than two lookup tables.

Each packet received by network device 300 has an associated set of packet addressing information 350. As shown, packet addressing information 350 can include source address 212, multicast group destination address 214, and RPF interface ID 356. Source address 212 and multicast group destination address 214 are obtained from the packet itself (e.g., as shown in FIG. 2). RPF interface ID 356 identifies which of the network device's input interfaces received the packet.

When network device 300 is determining how to forward a packet, addressing information 350 is used to generate keys for input to lookup table 302(1) and lookup table 302(2). For example, in one embodiment, network device 300 includes source address 212 and multicast group destination address 214 in the key input to lookup table 302(1). All or part of source address 212, multicast group destination address 214, and/or RPF interface ID 356 can also be used to generate the key input to lookup table 302(2).

The outcome of the lookup in lookup table 302(1) selects a subset of lookup table 302(2). The lookup in lookup table 302(2) will only be able to match an entry included in the selected subset. In the embodiment of FIG. 3, the selected subset of lookup table 302(2) includes entries that correspond to a particular type of multicast tree. For example, if the lookup in lookup table 302(1) matches an entry (e.g., entry 304(1)) corresponding to a shortest-path tree, a subset of lookup table 302(2) that corresponds to one or more shortest-path trees is selected (e.g., the selected subset would include one or more entries such as entry 306(1)). Similarly, if the lookup in lookup table 302(1) matches an entry corresponding to a shared multicast tree (e.g., entry 304(2)), a subset of lookup table 302(2) that corresponds to one or more shared trees is selected (e.g., the selected subset would include one or more entries such as entry 306(2)).

In this example, each entry in lookup table 302(1) identifies a subset of lookup table 302(2) by selecting a particular mask in mask table 310. Whenever a key matches an entry in lookup table 302(1), the mask selected by the matching entry is used to generate the key for the lookup in lookup table 302(2). That key, which is generated using the selected mask, only matches entries in lookup table 302(2) that correspond to that mask. For example, each entry in lookup table 302(2) can include one or more bits that identify one of the masks. Each key generated using a mask also includes one or more bits identifying the mask used to generate that key. The key will only match an entry in lookup table 302(2) if that entry includes bits identifying the mask that was used to generate the key.

Mask table 310 is an example of a lookup restriction unit that restricts the lookup in lookup table 302(2) to only matching entries in the portion (e.g., one or more entries) of lookup table 302(2) identified by an entry in 302(1). In other words, mask table 310 (or another type of lookup restriction unit) operates to prevent the portion of the lookup in lookup table 302(2) from matching any entry that is not part of the portion of lookup table 302(2) identified by the lookup in lookup table 302(1). Other types of lookup restriction units can prevent the second key (the key input to lookup table 302(2)) from being compared to entries other than those included in the identified portion of lookup table 302(2) (as opposed to preventing the second key from matching other entries, as is done by mask table 310). Such lookup restriction units are examples of means for restricting a lookup in lookup table 302(2) based on an outcome of a lookup in lookup table 302(1).

It is noted that in some embodiments, packet addressing information 350 is processed (e.g., by a compression or hashing algorithm) before the selected mask is applied. Alternatively (or additionally), the masked packet addressing information 350 can be similarly processed after the selected mask is applied. Additionally, in some embodiments, all of the bits of multicast group destination address 214 are used for forwarding. For example, in one embodiment, multicast group destination address 214 is not compressed or truncated, and every bit in multicast group destination address 214 is used to generate the key provided lookup table 302(2).

As shown, if the key input to lookup table 302(1) matches an entry (S, G, *) (e.g., entry 304(1)) corresponding to a shortest-path (S, G) tree, that entry selects mask (S, G, C) stored in entry 312(1) of mask table 310. When the (S, G, C) mask is applied to packet addressing information 350, at least part of each of source address 212, multicast group destination address 214, and RPF interface ID 356 are selected for inclusion in the key to be input to lookup table 302(2). This key can also include information identifying the (S, G, C) mask in entry 312(1).

Similarly, if the key input to lookup table 302(1) matches an entry (*, G, *) (e.g., entry 304(2)) corresponding to a shared (*, G) tree, that entry selects a mask (*, G, C) stored in entry 312(2) of mask table 310. Applying the (*, G, C) mask to packet addressing information 350 selects at least part of multicast group destination address 214 and RPF interface ID 356. The (*, G, C) mask masks out source address 212 so that it is not included in the key provided to lookup table 302(2). The key generated from the (*, G, C) mask can also include information identifying the (*, G, C) mask.

In some embodiments, each (S, G, *) entry in lookup table 302(1) that corresponds to a shortest-path tree selects the same (S, G, C) mask in mask table 310. Accordingly, the (S, G, C) mask can select a subset of lookup table 302(2) that includes all entries in lookup table 302(2) that correspond to shortest-path trees. Similarly, all (*, G, *) entries in lookup table 302(1) can select the same (*, G, C) mask in mask table 310, such that the (*, G, C) mask selects a subset of lookup table 302(2) that includes all entries in lookup table 302(2) that correspond to shared trees.

By including at least a portion of RPF interface ID 356 in the key provided to lookup table 302(2), network device 300 uses lookup table 302(2) to perform RPF-interface verification. The key provided to lookup table 302(2) will only match an entry in lookup table 302(2) if the packet was received via an appropriate RPF interface. In other words, the key provided to lookup table 302(2) will only match an entry in lookup table 302(2) if that entry corresponds to the same values of source address 212, multicast group destination address 214, and RPF interface ID 356 as the values that were used to generate that key.

If the packet was not received via an appropriate RPF interface, the key will not match any entries in lookup table 302(2). Such packets are referred to as non-RPF traffic in FIG. 3. If no matching entry is found in lookup table 302(2) for a given packet, network device 300 will use the entry in adjacency table 318 pointed to by the matching entry in lookup table 302(1) to forward that packet. In such a situation, the adjacency table entry selected by lookup table 302(1) indicates that the packet requires special handling (e.g., the adjacency table entry may indicate that the packet should be handled in software).

While some embodiments of network device 300 include hardware that generates entries for use when performing cascaded lookups, alternative embodiments include software that controls the allocation of entries such as entries 304(1), 304(2), 306(1), 306(2), 312(1), and 312(2) for use when performing cascaded lookups. For example, software can be installed on network device 300 that causes network device to allocate entries such as entries 304(1), 304(2), 306(1), 306(2), 312(1), and 312(2). This software dynamically allocates and deallocates these entries as multicast trees are created and removed (e.g., through the use of multicast join and prune messages) in response to network traffic.

In some embodiments, network device 300 is originally designed without support for multicast packet forwarding, and software configured to allocate entries such as entries 304(1), 304(2), 306(1), 306(2), 312(1), and 312(2) is later provided as an upgrade that will allow network device 300 to support multicast packet forwarding. Few hardware changes, if any, may be needed in order to reconfigure network device 300 to support multicast forwarding in such an embodiment.

In some embodiments, network device 300 supports IPv6 multicast packets. However, lookup tables 302(1) and 302(1) may have originally been designed for use with non-IPv6 packets (e.g., these lookup tables may have originally been designed for use with IPv4 packets). For example, in one embodiment, lookup table 302(1) may have originally been designed to identify which ACL (Access Control List) rule and/or QOS (Quality of Service) level to use when forwarding each packet received by network device 300. Similarly, lookup table 302(2) may have originally been designed to identify a network flow (netflow) state for each packet. In such an embodiment, network device 300 can continue to use lookup tables 302(1) and 302(2) for their original purpose (e.g., when handling non-IPv6 multicast packets) in addition to using them to perform IPv6 multicast forwarding. Similarly, in some of these embodiments, network device 300 is originally designed to support IPv6 unicast forwarding with a separate lookup table (not shown). This forwarding table supports keys having at least 128 bits, but does not support keys having 256 or more bits, as would be needed to handle IPv6 multicast lookups (assuming no compression is used to generate the keys). By installing software on network device 300 that uses multiple lookup tables to perform a cascaded lookup when forwarding IPv6 multicast packets, IPv6 multicast forwarding capabilities can be added to network device 300 without redesigning much, if any, of the hardware in network device 300.

Figure 4:
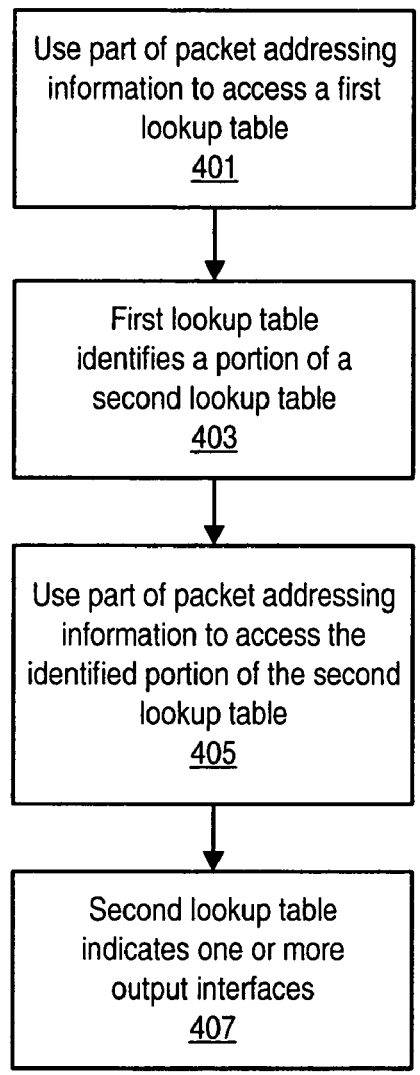
FIG. 4 is a flowchart of a method of using a cascaded lookup to forward a packet having a multicast destination address, according to one embodiment of the present invention.

FIG. 4 is a flowchart of a method of using a cascaded lookup to forward a packet. While this flowchart presents an example that uses two lookup tables, it is noted that other embodiments can perform cascaded lookups using more that two lookup tables.

At 401, a portion of the packet addressing information is used to access a first lookup table. For example, a portion of the source address and a portion of the destination address of the packet can be used to generate a key that is input to the first lookup table. In one embodiment, the destination address is a multicast address. The key matches an entry in the first lookup table.

The first lookup table can then identify a subset of a second lookup table, as shown at 403. For example, the key provided to the first lookup table can match an entry that points to a mask, as shown in the example of FIG. 3. This mask corresponds to a subset of the second lookup table. Alternatively, a matching entry in the first lookup table can select one or more values or pointers that identify a range of entries in the second lookup table.

At 405, a portion of the packet addressing information is used to access the selected subset of the second lookup table. For example, a key generated from the source address, destination address, and/or RPF interface ID can be input to the second lookup table. The lookup can be restricted to the selected subset in several ways. For example, in one embodiment, the key can include one or more bits that will only match lookup table entries within the selected subset, as described above with respect to FIG. 3. Alternatively, if the matching entry in the first lookup table includes values that identify a range of entries in the second lookup table, the lookup can be restricted to entries within that range.

In response to being accessed, the second lookup table identifies a set of one or more output interfaces to which the packet should be forwarded, as shown at 407. For example, a key input to the second lookup table can match an entry in the selected subset of the second lookup table, and the matching entry can point to information identifying the output interface(s) to which the packet should be forwarded.

Figure 5:
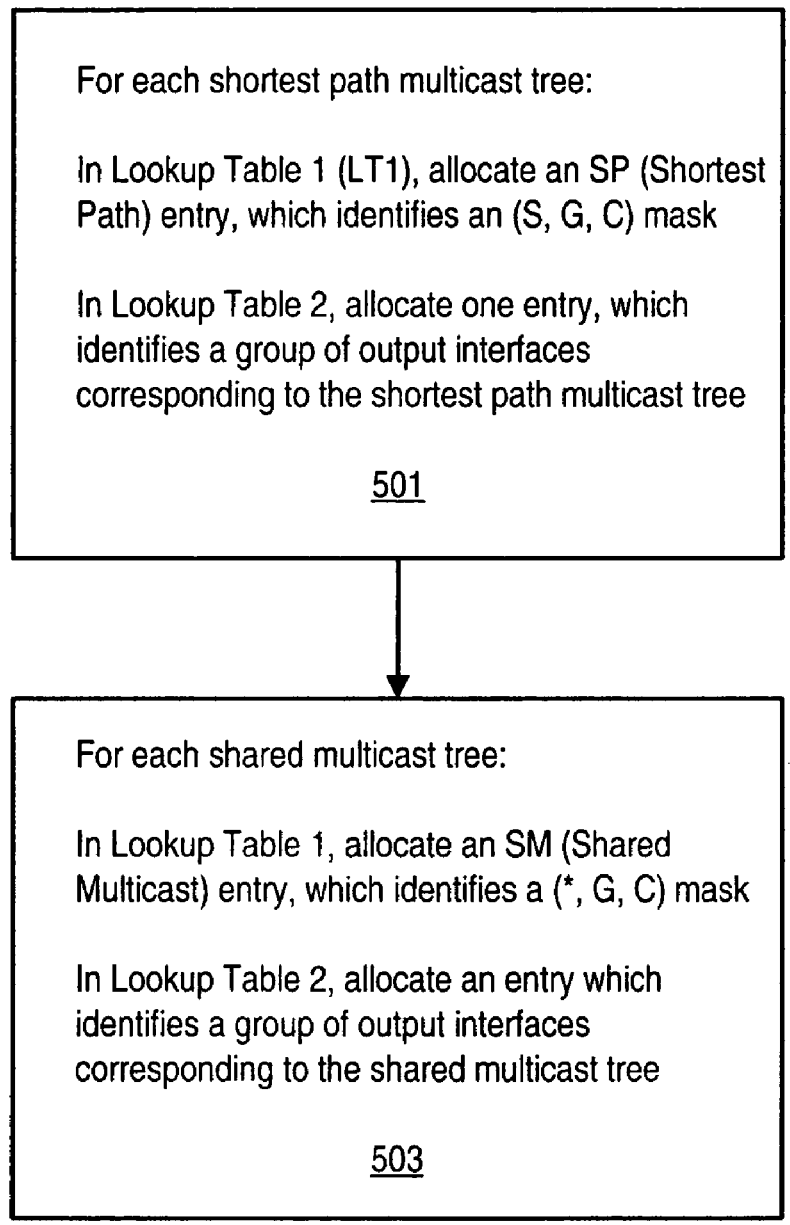
FIG. 5 is a flowchart of a method of allocating entries in each of two lookup tables for use when forwarding a packet having a multicast group destination address, according to one embodiment of the present invention.

FIG. 5 shows an example of how entries in each of two lookup tables can be allocated for use when forwarding a packet having a multicast group destination address. It is noted that entry allocation can be performed differently in other embodiments, (e.g., in embodiments do not use masks to select subsets of the second lookup table). At 501, at least one lookup table entry is allocated in each lookup table for each shortest-path multicast tree. In this example, a single entry, referred to as an SP (Shortest Path) entry, is allocated in each of two lookup tables, Lookup Table 1 and Lookup Table 2, for each shortest-path tree. Multicast lookups are cascaded over Lookup Table 1 and Lookup Table 2 (e.g., as described above with respect to FIGS. 3 and 4). The lookup in Lookup Table 1 selects the subset of Lookup Table 2 in which the second half of the cascaded lookup will be performed.

As shown at 501, for a given shortest-path multicast tree, the SP entry allocated in Lookup Table 1 identifies a (S, G, C) mask, which in turn selects at least a portion of a source address, a multicast group destination address, and an RPF interface ID, for use in generating the key used to perform the second half of the cascaded lookup in Lookup Table 2. The SP entry allocated in Lookup Table 2 identifies (e.g., by pointing to an appropriate entry in an adjacency table) a group of output interfaces corresponding to the shortest-path multicast tree. This entry will only match keys that are generated from addressing information that includes the appropriate RPF interface ID for that shortest-path tree. Additionally, this entry will only match keys that are generated using the mask identified by the entry allocated in Lookup Table 1 for that particular shortest-path multicast tree.

At 503, one or more entries are allocated in each lookup table for each shared multicast tree. For a given shared multicast tree, a single SM (Shared Multicast) entry is allocated in Lookup Table 1. This entry identifies (*, G, C) mask, which in turn selects at least a portion of the packet's multicast group destination address and RPF interface ID for use in generating the key used for Lookup Table 2. A single SM entry is also allocated in Lookup Table 2 for that shared multicast tree. This entry identifies a group of output interfaces corresponding to the shared multicast tree. For a given shared multicast tree, the SM entry allocated in Lookup Table 2 will only match keys that were generated using the mask identified in that shared multicast tree's entry in Lookup Table 1. Additionally, the SM entry in Lookup Table 2 only matches keys that were generated from the appropriate RPF interface ID for that shared multicast tree.

Figure 6:
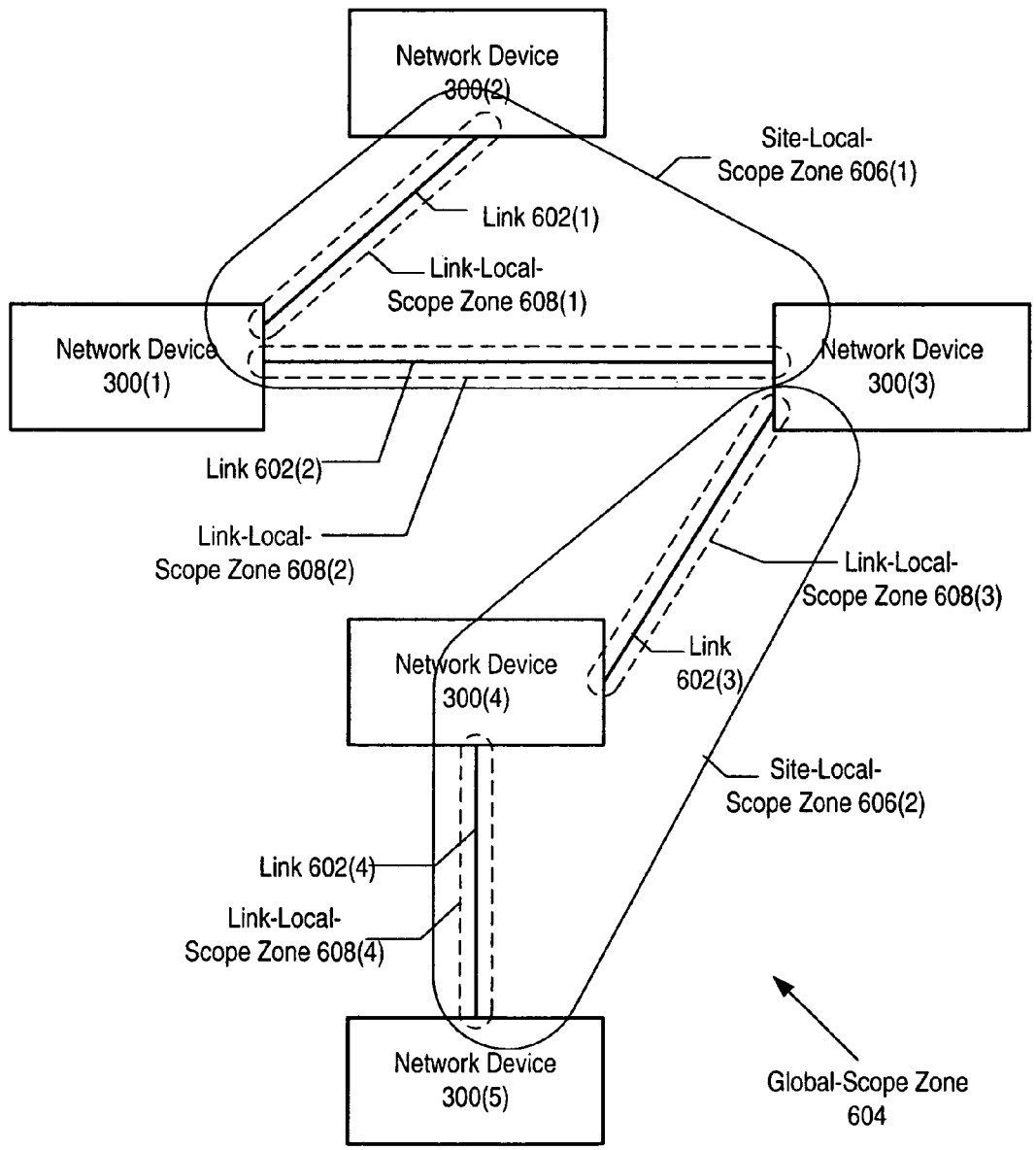
FIG. 6 is a block diagram of a network that includes several link-local and site-local zones.

FIG. 6 is a block diagram of a network that includes several IPv6 link-local and site-local zones. The network includes several network devices 300(1)-300(5). Network devices 300(1) and 300(2) are coupled by link 602(1). Link 602(2) couples network devices 300(1) and 300(3). Network devices 300(3) and 300(4) are coupled by link 602(3). Likewise, network devices 300(4) and 300(5) are coupled by link 602(4).

Each zone has a particular scope: global, site-local, or link-local. In IPv6, zones of a smaller scope must lie entirely within a zone of a larger scope with which the smaller-scoped zone shares links or interfaces (i.e., a smaller zone cannot span more than one zone of a larger scope). The global scope is the largest scope, and thus zones of all other scopes lie entirely within the global scope. Site-local scope is larger than link-local scope, and thus a link-local zone will lie entirely within a site-local zone.

The entire network is included in global-scope zone 604. Interfaces coupled to links 602(1) and 602(2) in each of network devices 300(1), 300(2), and 300(3) are included in site-local-scope zone 606(1). Interfaces coupled to links 602(3) and 602(4) in each of network devices 300(3), 300(4) and 300(5) are included in site-local-scope zone 606(2). Site-local-scope zones 606(1) and 606(2) each lie entirely within global-scope zone 604.

Interfaces coupled to link 602(1) are part of link-local-scope zone 608(1). Interfaces coupled to link 602(2) are included in link-local-scope zone 608(2). Both link-local-scope zone 608(1) and link-local-scope zone 608(2) lie entirely within site-local-scope zone 606(1).

Interfaces coupled to link 602(3) are included in link-local-scope zone 608(3). Interfaces coupled to link 602(4) are part of link-local-scope zone 608(4). Link-local-scope zone 608(3) and link-local-scope zone 608(4) both lie entirely within site-local-scope zone 606(2).

In IPv6, addresses are not usable outside of a particular zone. For example, a site-local address is only useable within the particular site-local zone that includes the device identified by that site-local address. Several scope-specific virtual forwarding tables are used to restrict packet forwarding based on the scope of the source and destination address. The use of these scope-dependent virtual forwarding tables ensures that packets sent from an address in a particular zone are not forwarded outside of that zone. For example, a device with a site-local address will not be able to send a packet to a device with a global address unless the destination device is included in the same site-local zone as the source device.

FIG. 7 shows how the scopes of the source and destination addresses select one of several virtual forwarding tables and/or restrict the set of output interfaces indicated by the selected virtual forwarding table. FIG. 7 illustrates a table 700. Table 700 indicates the scope of the virtual forwarding table to use when forwarding a packet, based on the scope of the packet's source and destination addresses. As shown, if a packet has a global source address (SA) and a global destination address (DA), the packet is forwarded according to a global virtual forwarding table. For a given destination address, the global virtual forwarding table can identify any one or more of the network device's output interfaces (oifs).

Similarly, if the packet has a site-local source address and a site-local destination address, the packet is forwarded according to a site-local virtual forwarding table. For a given destination address, the site-local virtual forwarding table can identify one or more of the network device's output interfaces that are included within the same site-local zone as the input interface (iif) that received the packet. A network device can implement several site-local virtual forwarding tables, one for each site-local zone in which that network device is included. For example, looking at FIG. 6, network device 300(3) implements one site-local virtual forwarding table for site-local-scope zone 606(1) and another site-local virtual forwarding table for site-local-scope zone 606(2).

If the packet has a link-local source address and a link-local destination address, the packet is forwarded according to a link-local virtual forwarding table. The site-local virtual forwarding table can, for a particular destination address, identify one or more of the network device's output interfaces that are included within the same link-local zone as the input interface that received the packet. As with site-local virtual forwarding tables, a network device can implement several link-local virtual forwarding tables at any given time.

When the scope of the source address differs from the scope of the destination address, the scope of the destination address determines which virtual forwarding table to use to forward the packet. Thus, when a packet has a global source address and a site-local destination address, the site-local virtual forwarding table is used to forward that packet. Similarly, if a packet has a global or site-local source address and a link-local destination address, the link-local virtual forwarding table is used to forward that packet.

If the scope of the source address is smaller than the scope of the destination address, it may be necessary to selectively forward the packet to only certain ones of the output interfaces identified in the virtual forwarding table. For example, when the scope of the source and destination addresses of a particular packet are different, the scope of the source address determines the output interfaces to which the packet can be forwarded. As shown in table 700, if a packet has a site-local source address and a global destination address, the packet will be forwarded according to the global virtual forwarding table. However, the packet may not be forwarded to all of the output interfaces identified by the global forwarding table. Instead, the packet will only be forwarded to identified output interfaces that are within the same site-local zone as the input interface that received the packet. Similarly, if a packet has a link-local source address and a destination address of a larger scope, the packet will only be forwarded to identified output interfaces that lie within the same link-local zone as the input interface that received the packet.

Figure 8:
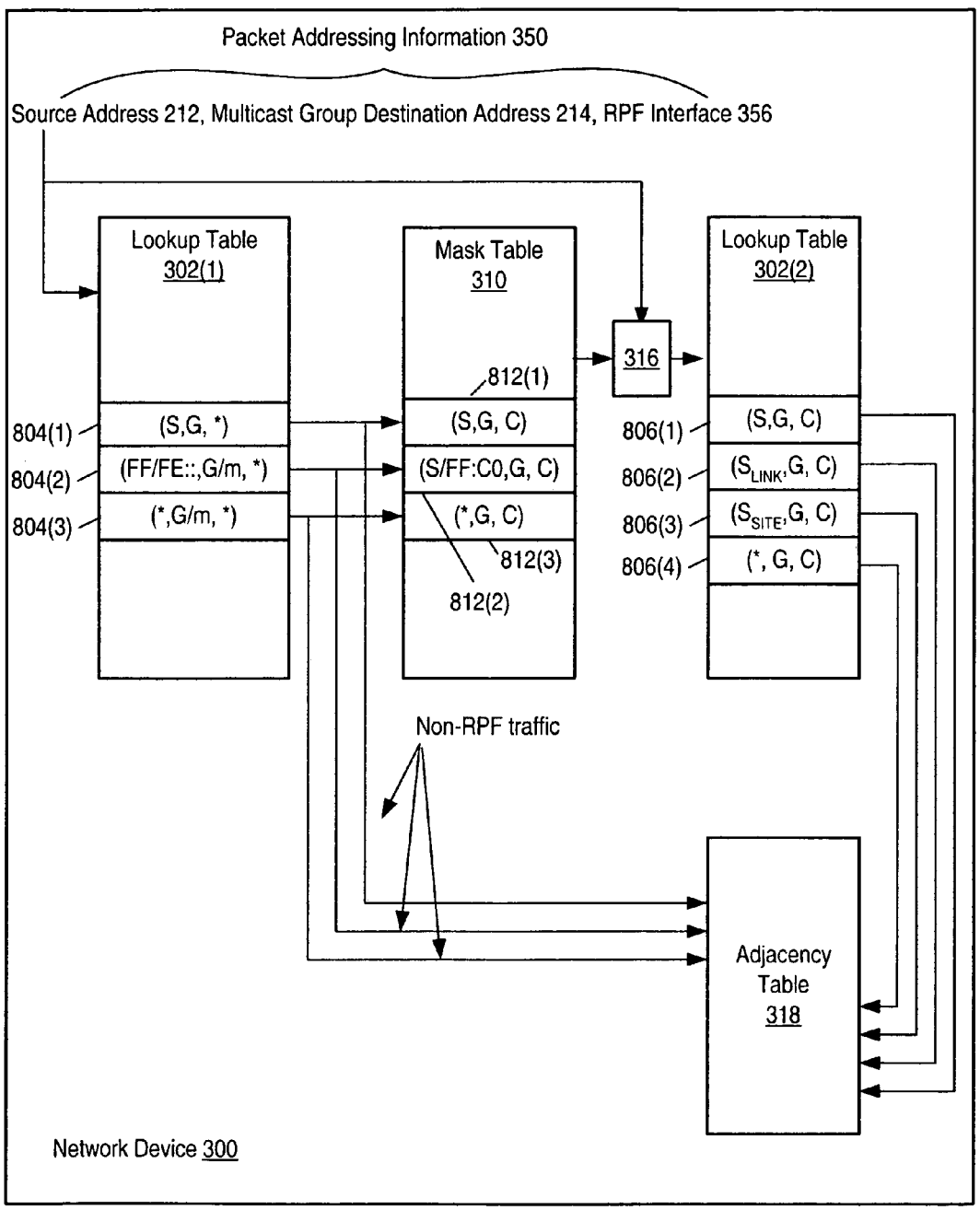
FIG. 8 is a block diagram of a network device that uses a cascaded lookup to implement the scoped lookup shown in FIG. 7, according to one embodiment of the present invention.

FIG. 8 illustrates an example of a network device that is configured to forwarded multicast packets while also supporting scopes such as those described in FIGS. 6 and 7. In this embodiment, network device 300 includes similar components those shown in FIG. 3, including lookup table 302(1) (shown with entries 804(1)-804(3)), lookup table 302(2) (shown with entries 806(1)-806(4)), mask table 310 (shown with entries 812(1)-812(3)), logic 316 (for applying a mask to information used to generate the key for use with lookup table 302(2)), and adjacency table 318. Network device 300 receives packets and uses packet addressing information 350, which includes source address 212, multicast group destination address 214, and RPF interface ID 356, to forward each packet. In other embodiments, similar lookup tables can be used to perform a cascaded lookup when forwarding unicast packets according to scoped forwarding rules.

As in the embodiment of FIG. 3, network device 300 of FIG. 8 performs cascaded lookups when forwarding multicast packets. A portion of packet addressing information 350 (e.g., at least a portion of source address 212 and at least a portion of multicast group destination address 214) is used to generate the key provided to lookup table 302(1). The lookup in lookup table 302(1) selects a subset of lookup table 302(2) in which to perform the second part of the cascaded lookup. Here, this is performed by having lookup table 302(1) select a mask. Each entry in lookup table 302(1) selects a mask in mask table 310. When the first portion of the cascaded lookup matches a particular entry in lookup table 302(1), the mask identified by that entry is then used to generate the key to be provided to lookup table 302(2). As described above with respect to FIG. 3, lookup table 302(2) is configured so that each entry will only match a key generated using a particular mask. Thus, the mask used to generate a key restricts the lookup using that key to the selected subset of lookup table 302(2).

In this example, three entries, entries 804(1)-804(3), are shown in lookup table 302(1). It is noted that at any given time, lookup table 302(1) can include one or more such entries for each of several different multicast groups. Entry 804(1) corresponds to a shortest-path (S, G) multicast tree. Entry 804(1) will match a key generated from a particular source address 212 and multicast group destination address 214. Entry 804(1) selects the mask in entry 812(1) of mask table 310. This mask selects the source address 212, multicast group destination address 214, and RPF interface ID 356 of packet addressing information 350 for use when generating the key used to access lookup table 302(2). In some embodiments, this mask is selected by all entries in lookup table 302(1) that correspond to shortest-path multicast trees. In such embodiments, keys generated using this mask will only be able to match entries in lookup table 302(2) that correspond to shortest-path multicast trees, and thus the lookup in lookup table 302(1) selects the subset of lookup table 302(2) that corresponds to shortest-path multicast trees.

Entries 804(2) and 804(3) each correspond to a particular shared multicast tree. Entry 804(2) will match a key generated using a source address having a non-global scope. For example, in an embodiment that forwards IPv6 packets, entry 804(2) is designed to match a key generated from a site- or link-local address, as indicated by the first eight bits of the source address having value FEh (11111110b). A match with entry 804(2) also depends on at least a portion (e.g., the upper m bits, referred to as G/m) of the multicast group destination address.

Entry 804(2) selects the mask in entry 812(2) of mask table 310. This mask selects (at least) enough of the source address 212 to identify the scope of the source address (e.g., the uppermost 10 bits, bit FF through bit C0, in an IPv6 address), all of multicast group destination address 214, and all of RPF interface ID 356 of packet addressing information 350 for use when generating the key used to access lookup table 302(2). In some embodiments, this mask is selected by all entries in lookup table 302(1) that correspond to shared multicast trees and that match packets having non-global scopes. Keys generated using this mask will only be able to match entries in lookup table 302(2) that correspond to shared multicast trees and that correspond to non-global source addresses, and thus the lookup in lookup table 302(1) selects the subset of lookup table 302(2) that corresponds to shared multicast trees and non-global source addresses.

Entry 804(3) will match a key generated using a particular value of at least a portion (e.g., the upper m bits) of a multicast group destination address. Entry 804(2) and entry 804(3) can correspond to the same shared multicast tree or the same group of shared multicast trees (e.g., if multiple multicast trees have the same value of the portion (e.g., the upper m bits) of the multicast group destination address included in the a key provided to lookup table 302(1)). In such a situation, a key that could potentially match both entries will match 804(2) (e.g., according to longest-prefix matching).

Entry 804(3) selects the mask in entry 812(3) of mask table 310. This mask selects all of multicast group destination address 214 and all of RPF interface ID 356 of packet addressing information 350 for use when generating the key used to access lookup table 302(2). En some embodiments, this mask is selected by all entries in lookup table 302(1) that correspond to shared multicast trees and that match packets having global source addresses. Keys generated using this mask will only be able to match entries in lookup table 302(2) that correspond to shared multicast trees and that correspond to global source addresses, and thus the lookup in lookup table 302(1) selects the subset of lookup table 302(2) that corresponds to shared multicast trees and global source addresses.

Four entries are shown within lookup table 302(2) (again, it is noted that, at any given time, lookup table 302(2) can include one or more similar entries for each of several different multicast groups). Entry 806(1) corresponds to a shortest-path multicast tree and will match a key generated using a particular source address 212, multicast group destination address 214, and RPF interface ID 356. Entry 806(1) selects an entry in adjacency table 318 that identifies a set of output interfaces to which a multicast packet should be forwarded.

The value in this adjacency table entry corresponds to the value obtained when forwarding the multicast packet using a global, link-local, or site-local virtual forwarding table, depending on the particular scope of the multicast packet's destination address.

Entries 806(2)-806(4) correspond to a shared multicast tree. Entry 806(2) matches a key generated using a link-local source address (e.g., any IPv6 address in which the first ten bits are 1111111010b) and particular values of multicast group destination address 214 and RPF interface ID 356. Entry 806(3) matches a key generated using a site-local source address (e.g., any IPv6 address in which the first ten bits are 1111111011b) and particular values of multicast group destination address 214 and RPF interface ID 356. Entries 806(2) and 806(3) will only match keys generated using the mask stored in entry 812(2) of mask table 310 (e.g., these entries are included in the subset of lookup table 302(2) that corresponds to shared multicast trees and packets in which the source address potentially has a smaller scope than the destination address).

Entry 806(4) matches a key generated using a particular value of multicast group destination address 214 and RPF interface ID 356. Additionally, entry 806(4) will only match a key that was generated using the mask stored in entry 812(1) of mask table 310.

Each entry 806(2)-806(4) points to a respective entry in adjacency table 318. The values in these adjacency table entries each correspond to the value obtained when forwarding the multicast packet using a global, link-local, or site-local virtual forwarding table, depending on the scope of the multicast packet's destination address.

The adjacency table entry pointed to by entry 806(2) identifies a set of output interfaces to which a packet should be forwarded. If the scope of the packet's link-local source address is smaller than the scope of the packet's destination address, each identified output interface is included in the same link-local zone as the input interface that received the packet. Similarly, the adjacency table entry pointed to by entry 806(3) identifies a set of output interfaces to which a packet should be forwarded. If the scope of the packet's site-local source address is smaller than the scope of the packet's destination address, each identified output interface is included in the same site-local zone as the input interface that received the packet. The adjacency table entry pointed to by entry 806(4) also identifies a set of output interfaces to which a packet should be forwarded. Since any packet matching entry 806(4) has a global source address (entry 806(4) will only match keys generated using the mask in entry 812(3) of mask table 310), this adjacency table entry can identify any output interfaces, regardless of the scope of the source address.

By differentiating between global and non-global source addresses when performing the lookup in lookup table 302(1), the cascaded lookup can differentiate between packets having a source address of equal or greater scope than the destination address (e.g., all packets with global source addresses) and packets having a source address of potentially lesser scope than the destination address (e.g., all packets with site- and link-local source addresses). If a packet's source address is potentially of a smaller scope than the packet's destination address, the scope of the source address will be included in the key provided to lookup table 302(2). Accordingly, lookup table 302(2) can be configured so that situations in which output interface filtering (e.g., such as indicated in the last three rows of table 700 of FIG. 7) is needed are detected.

In some embodiments, network device 300 can allocate entries in adjacency table 318 such that packets will always be forwarded according to the rules for scoped address (e.g., as shown in FIG. 7). Thus, entries can be programmed that correspond to each link- and site-local zone of which network device 300 is a part. For example, the masks in entries 812(1) and 812(2) of mask table 310 can also select the VLAN ID for a packet to be used when generating the key provided to lookup table 302(2). Each VLAN ID has a unique mapping to a particular site-local zone and/or to a particular link-local zone. By including the VLAN ID in the key used for lookup table 302(2), a match in lookup table 302(2) is forced to depend on the zone of the particular input interface that received the packet. Additionally, by providing enough of the source address to identify the scope of the source address (for non-global source addresses) in the key provided to lookup table 302(2), matches in lookup table 302(2) also depend on the scope of the source address. Since the match depends on the scope of the source address, the zone of the input interface, and the multicast group destination address, a matching entry in lookup table 302(2) can select an appropriate entry in adjacency table 318 that complies with the forwarding rules of FIG. 7. Accordingly, network device 300 can both detect situations in which output interface filtering is needed and perform this filtering as part of the cascaded lookup (e.g., as opposed to having to filter the output interfaces identified in adjacency table 318 subsequent to completing the cascaded lookup).

Thus, as shown by the example of FIG. 8, network device 300 can be configured to perform a cascaded lookup that complies with scoped-forwarding rules when forwarding a multicast packet. A lookup in a first lookup table can be used to select a subset of the second lookup table. The selected subset corresponds to a particular type of multicast tree (e.g., shortest-path or shared). For certain packets (e.g., packets in which the source address is potentially of a smaller scope than the destination address), the selected subset of the second lookup table can include entries that are specific to an input interface zone and to a particular source address scope, and matches in the second lookup table are conditioned on the zone of the input interface that received the packet and on the scope of the source address of the packet. Accordingly, the second half of the cascaded lookup can be used to perform output filtering in addition to identifying a set of output interfaces that correspond to a given virtual forwarding table. For example, if a packet has a site-local source address and a global multicast group destination address, the lookup in the second lookup table will depend on the particular site-local zone of the input interface that received the packet. The matching entry in the second lookup table will identify a set of output interfaces that are consistent with a global forwarding table and that are included in the same site-local zone as the input interface that received the packet.

Figure 9:
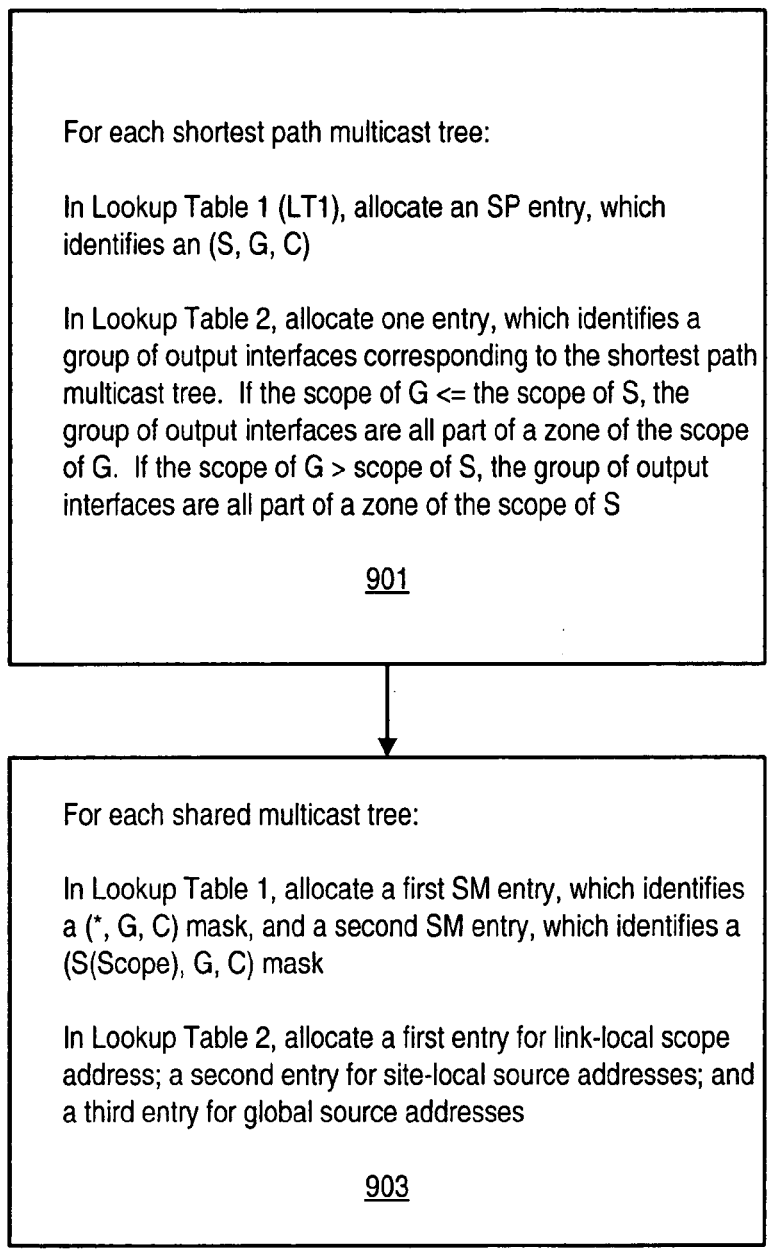
FIG. 9 is a flowchart of a method of allocating entries in two lookup tables for use when performing a scoped lookup, according to one embodiment of the present invention.

FIG. 9 is a flowchart of a method of allocating entries in multiple lookup tables for use when performing a scoped multicast lookup, according to one embodiment of the present invention. It is noted that entry allocation is performed differently in other embodiments (e.g., embodiments that do not use a mask to select a subset of the second lookup table).

As indicated at 901, a single entry is allocated in each of two lookup tables, Lookup Table 1 and Lookup Table 2, for each shortest-path multicast tree. For example, for a particular shortest-path multicast tree, an SP (Shortest Path) entry is allocated in Lookup Table 1 (LT1). This entry matches a key generated from a packet having a particular source address S and a particular multicast group destination address G. This SP entry identifies a (S, G, C) mask, which selects the packet's source address, multicast group destination address, and RPF interface ID for use in generating the key for Lookup Table 2.

An entry is also allocated in Lookup Table 2 for the shortest-path multicast tree. This entry identifies a group of output interfaces corresponding to that shortest-path multicast tree. If the scope of the multicast group destination address is less than or equal to the scope of source address, the group of output interfaces identified by this entry are all part of a zone of the same scope as the destination address (e.g., the output interfaces are identified by a global, link-local, or site-local virtual forwarding table, as described above with respect to FIG. 7). If instead the scope of the multicast group destination address is greater than the scope of the source address, the group of output interfaces identified by this entry are all included in a zone that has the scope of S (e.g., the output interfaces are all included in the same zone as the input interface that received the packet). This entry in Lookup Table 2 will only match a key that (a) includes the correct RPF interface ID and (b) is modified by the mask identified by the SP entry in Lookup Table 1.

As shown at 903, several entries can be allocated in each lookup table for each shared multicast tree. For a given shared multicast tree, two SM (Shared Multicast) entries can be allocated in Lookup Table 1. The first SM entry identifies a (*, G, C) mask selecting a packet's multicast group destination address and RPF interface ID. The second SM entry identifies a mask selecting (at least) the portion of the packet's source address that identifies the source address scope and all of the packet's destination address and RPF interface ID. The mask identified by the second SM entry can also select the VLAN ID of the packet to be included in the key used for the second portion of the lookup. When packets are forwarded using that shared multicast tree, packets having global source addresses will match the first SM entry and packets having non-global source addresses will match the second SM entry.

In Lookup Table 2, at least three entries are generated for each shared multicast tree. The first entry matches keys generated for packets having link-local source addresses. The first entry identifies a group of output interfaces according to a virtual forwarding table (the scope of the virtual forwarding table depends on the multicast group destination address for a given shared multicast tree). If the scope of a packet's source address is less than the scope of the multicast group destination address, this group of output interfaces is restricted to output interfaces that are part of the link-local zone that includes the input interface that received the packet.

The second entry matches keys generated for packets having site-local source addresses. Like the first entry, the second entry identifies a group of output interfaces according to a virtual forwarding table (again, the scope of the virtual forwarding table depends on the multicast group destination address for the shared multicast tree). If the scope of the source address is less than the scope of the destination address, the group of output interfaces is restricted to output interfaces in the same site-local zone as the input interface that received the packet. The first and second entries will only match keys that are generated using the mask selected by the second SM entry in Lookup Table 1.

The third entry matches keys generated for packets having global source addresses. As with the first and second entries, the third entry identifies a group of output interfaces according to a virtual forwarding table (again, the scope of the virtual forwarding table depends on the multicast group destination address for the shared multicast tree). Since any packet that matches this entry has a global source address, the output interfaces will be in a zone of the same scope as the multicast group destination address. The third entry only matches keys generated using the mask identified in the first SM entry in Lookup Table 1.

It is noted that if a multicast route changes, the changes to the route can be reflected in the lookup tables by updating one or more entries in the second lookup table. For example, if a multicast route is modified, the entry or entries corresponding to that shared multicast route in the second lookup table are updated to identify the new output interfaces to use when forwarding packets along that multicast route. Accordingly, even though two lookup tables are used to perform multicast forwarding, only one of the lookup tables needs to be updated whenever a multicast route changes.

Figure 10:
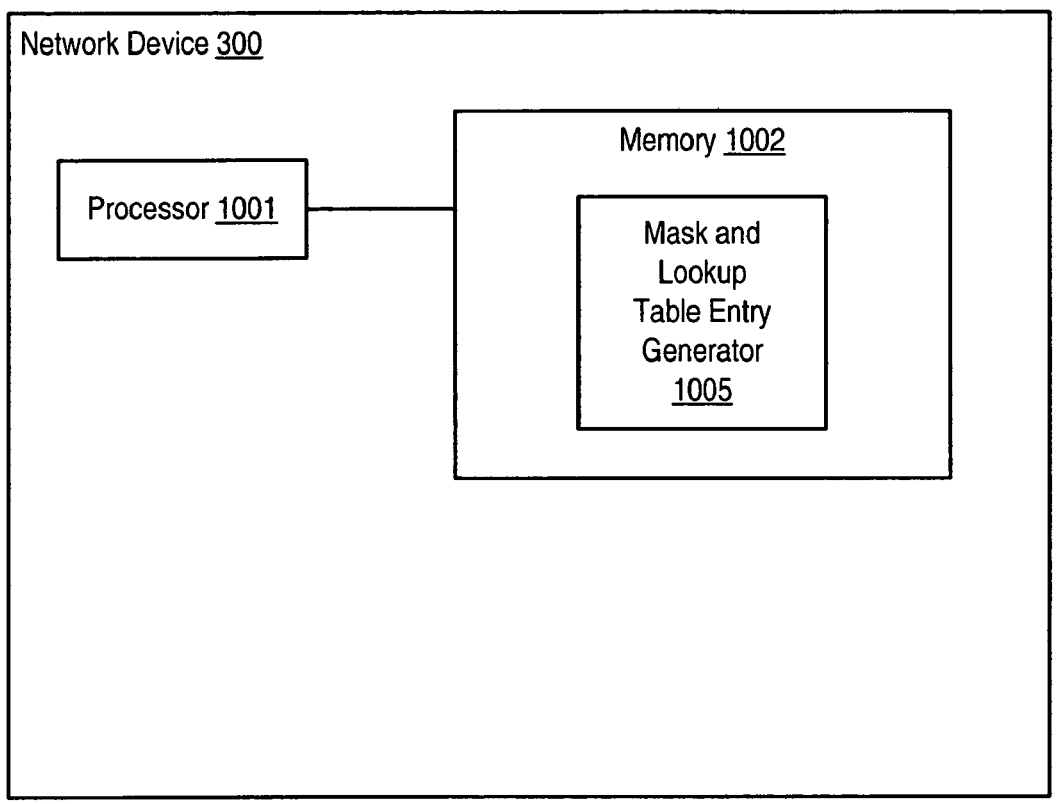
FIG. 10 illustrates how software can generate the entries in lookup tables for use when forwarding packets with multicast group destination addresses, according to one embodiment of the present invention.

FIG. 10 illustrates how software can generate lookup table entries and masks for use when performing cascaded lookups to forward packets with multicast group destination addresses. FIG. 10 is a block diagram of network device 300. As illustrated, network device 300 includes one or more processors 1001 (e.g., microprocessors, PLDs (Programmable Logic Devices), or ASICs (Application Specific Integrated Circuits)) configured to execute program instructions stored in memory 1002. Memory 1002 can include various types of RAM, ROM, Flash memory, MEMS memory, and the like. Processor 1001 and memory 1002 are coupled to send and receive data and control signals by a bus or other interconnect. Processor 1001 can also be coupled to control lookup tables 302(1), 302(2), mask table 310, and adjacency table 318 (e.g., as shown in FIG. 3 and FIG. 8). These lookup tables are implemented using separate logic and/or memory devices in some embodiments. In other embodiments, these lookup tables are implemented using data and program instructions in memory 1002. Separate hardware (and/or software) in network device 300 receives packets and generates and/or obtains appropriate addressing information needed to forward that packet using the lookup tables. For example, in one embodiment, other software can generate the keys used to access lookup tables 302(1) and 302(2).

Memory 1002 stores program instructions executable by processor 1001 to implement mask and lookup table entry generator 1005. Mask and lookup table entry generator 1005 responds to network traffic by allocating and de-allocating entries in multiple lookup tables that can be used to perform a cascaded lookup when forwarding a multicast packet. For example, mask and lookup table entry generator 1005 can perform method functions similar to those illustrated in FIGS. 5 and 9 in some embodiments. In some embodiments, if masks are not used to restrict lookups in the second lookup table to the portion of the second lookup table identified by the first lookup table, such program instructions are executable to configure other types of lookup restriction units to appropriately implement cascaded lookups. A memory storing data and program instructions executable to implement mask and lookup table entry generator 1005 is an example of a means for allocating entries used to perform a cascaded lookup.

The program instructions and data implementing mask and lookup table entry generator 1005 can be stored upon various computer readable media such as memory 1002. In some embodiments, mask and lookup table entry generator 1005 software is stored on a computer readable medium such as a CD (Compact Disc), DVD (Digital Versatile Disc), hard disk, optical disk, tape device, floppy disk, and the like). In order be executed by processor 1001, the instructions and data implementing mask and lookup table entry generator 1005 are loaded into memory 1002 from the other computer readable medium. The instructions and/or data implementing can also be transferred to network device 300 via a network such as the Internet or upon a carrier medium. In some embodiments, a computer readable medium is a carrier medium such as a network and/or a wireless link upon which signals such as electrical, electromagnetic, or digital signals, on which the data and instructions implementing mask and lookup table entry generator 1005 are encoded, are conveyed.

Although the present invention has been described with respect to specific embodiments thereof, various changes and modifications may be suggested to one skilled in the art. It is intended such changes and modifications fall within the scope of the appended claims.

What is claimed is:

1. A method, comprising:
   accessing a first lookup table based on a first portion of a packet header, wherein
      the first portion of the packet header comprises at least a first part of a multicast group destination address,
      the first lookup table identifies a subset of a second lookup table, and
      the subset of the second lookup table comprises at least one entry; and
   accessing the subset of the second lookup table based on a second portion of the packet header, wherein
      the second portion of the packet header comprises at least a second part of the multicast group destination address, and
      the accessing the first lookup table and the accessing the subset of the second lookup table are performed by a network device.

2. The method of claim 1, wherein
   the second lookup table identifies at least one output interface via which a packet comprising the packet header should be output.

3. The method of claim 2, wherein
   the subset of the second lookup table corresponds to one of a plurality of scopes.

4. The method of claim 3, wherein
   the subset of the second lookup table corresponds to a link-local scope of the scopes if a scope of the multicast group destination address is link-local;
   the subset of the second lookup table corresponds to a site-local scope of the scopes if the scope of the multicast group destination address is site-local; and
   the subset of the second lookup table corresponds to a global scope of the scopes if the scope of the multicast group destination address is global.

5. The method of claim 4, wherein
   if a scope of a source address comprised in the packet header is less than the scope of the multicast group destination address, each entry comprised in the subset of the second lookup table identifies only output interfaces associated with one of a plurality of zones, and
   a scope of the one of the zones is equal to the scope of the source address.

6. The method of claim 2, wherein
   the packet header comprises a source address,
   the subset of the second lookup table corresponds to a shortest-path multicast tree if a match for the source address is found in the first lookup table, and
   the subset of the second lookup table corresponds to a shared multicast tree if no match for the source address is found in the first lookup table.

7. The method of claim 2, wherein
   the accessing the subset of the second lookup table comprises providing a key to the second lookup table, wherein
      the key comprises an ID of a RPF (Reverse Path Forwarding) interface, and
      the RPF interface received a packet in which the packet header was comprised.

8. The method of claim 2, further comprising:
   the first lookup table indicating at least one of an access control rule and a quality of service level in response to receiving a key associated with a packet.

9. The method of claim 8, further comprising:
   the second lookup table indicating a state of a network flow in response to receiving a key associated with a packet.

10. The method of claim 8, further comprising:
    accessing a third lookup table to forward a packet addressed to an IPv6 (Internet Protocol version 6) unicast destination address, wherein
       a width of each entry in the third lookup table is less than a width of a key comprising both an IPv6 destination address and an IPv6 source address.

11. The method of claim 2, wherein the first lookup table identifies the subset of the second lookup table by identifying a mask, wherein
    a key generated using the mask only matches entries comprised in the subset of the second lookup table.

12. The method of claim 11, further comprising:
    applying the mask to the multicast group destination address and an interface ID, wherein
       the interface ID identifies an input interface that received a packet comprising the packet header.

13. The method of claim 12, wherein
    the packet header comprises a source address;
    the mask selects a portion of the source address identifying a scope of the source address if the source address has a non-global scope;
    the mask does not select any of the source address if the source address has a global scope.

14. The method of claim 12, wherein
    the mask selects all of the source address if the accessing the first lookup table comprised matching an entry, which corresponds to a shortest-path multicast tree, in the first lookup table.

15. The method of claim 11, further comprising
    applying the mask to the second portion of the packet header to produce a masked second portion; and
    generating a hash based on the masked second portion, wherein
       the accessing the second lookup table dependent on the second portion of the packet header comprises:
          providing a key comprising the hash to the second lookup table.

16. The method of claim 2, further comprising:
    allocating a single entry in the first lookup table for each shortest-path multicast tree.

17. The method of claim 16, further comprising:
    for each shared multicast tree, allocating a first entry and a second entry in the first lookup table, wherein
       the first entry matches a source address having a global scope, and
       the second entry matches a source address having a non-global scope.

18. The method of claim 17, further comprising:
    allocating a plurality of entries in the second lookup table for each shared multicast tree, wherein
       each of the entries corresponds to a respective one of a plurality of scopes, and
       each of the entries only identifies output interfaces included in a zone of the respective one of the plurality of scopes.

19. A system comprising:
a network device, wherein the network device comprises:
  a first lookup table comprising a plurality of first lookup table entries;
  a second lookup table comprising a plurality of second lookup table entries; and
  a lookup restriction unit wherein
    the first lookup table is configured to identify first information in response to receiving a first key generated from a first portion of a packet header,
    the first portion of the packet header comprises at least a first part of a multicast group destination address,
    the first information identifies a subset of the second lookup table,
    the subset of the second lookup table comprises at least one of the second lookup table entries; and
    the lookup restriction unit is configured to prevent a second key generated from a second portion of the packet header from matching any second lookup table entry that is not comprised in the subset of the second lookup table identified by the first information, wherein
      the second portion of the packet header comprises at least a second part of the multicast group destination address.

20. The system of claim 19, wherein
the second lookup table is configured to identify second information in response to receiving the second key, the second information identifying at least one output interface via which a packet comprising the packet header should be output.

21. The system of claim 20, wherein
the subset of the second lookup table corresponds to one of a plurality of scopes.

22. The system of claim 21, wherein
the subset of the second lookup table corresponds to a link-local scope of the scopes if a scope of the multicast group destination address is link-local;
the subset of the second lookup table corresponds to a site-local scope of the scopes if the scope of the multicast group destination address is site-local; and
the subset of the second lookup table corresponds to a global scope of the scopes if the scope of the multicast group destination address is global.

23. The system of claim 22, wherein
if a scope of a source address comprised in the packet header is less than the scope of the multicast group destination address, each second lookup table entry comprised in the subset of the second lookup table identifies only output interfaces associated with one of a plurality of zones, and
a scope of the one of the zones is equal to the scope of the source address.

24. The system of claim 20, wherein
the subset of the second lookup table corresponds to a shortest-path multicast tree if a match for a source address is found in the first lookup table; and
the subset of the second lookup table corresponds to a shared multicast tree if no match for the source address is found in the first lookup table.

25. The system of claim 20, wherein
the second key comprises an ID of a RPF (Reverse Path Forwarding) interface, and
the RPF interface received a packet in which the packet header was comprised.

26. The system of claim 20, wherein
the first information comprises a mask, wherein
a key generated using the mask only matches second lookup table entries comprised in the subset of the second lookup table.

27. The system of claim 26, wherein
the mask is applied to a source address, the multicast group destination address, and an interface ID to generate the second key,
the source address is comprised in the packet header, and
the interface ID identifies an input interface that received a packet comprising the packet header.

28. The system of claim 27, wherein
the mask selects a portion of the source address identifying a scope of the source address if the source address has a non-global scope;
the mask does not select any of the source address if the source address has a global scope.

29. The system of claim 28, wherein
the mask selects all of the source address if the accessing the first lookup table comprised matching an entry, which corresponds to a shortest-path multicast tree, in the first lookup table.

30. The system of claim 26, wherein
the mask is applied to the second portion of the packet header to produce a masked second portion,
a hash is generated based on the masked second portion, and
the second key comprises the hash.

31. The system of claim 20, wherein
the first lookup table comprises one first lookup table entry for each shortest-path multicast tree.

32. The system of claim 31, wherein
the first lookup table comprises a first entry and a second entry for each shared multicast tree,
the first entry matches a source address having a global scope, and
the second entry matches a source address having a non-global scope.

33. The system of claim 32, wherein
the second lookup table comprises a plurality of entries for each shared multicast tree,
each of the entries corresponds to a respective one of a plurality of scopes, and
each of the entries only identifies output interfaces included in a zone of the respective one of the plurality of scopes.

34. A computer readable non-transitory storage medium storing program instructions executable by a processor to:
  allocate at least one entry in a first lookup table and at least one first entry in a subset of a second lookup table for each multicast tree, wherein
    the subset of the second lookup table comprises at least one entry; and
  configure a lookup restriction unit to prevent a lookup in the second lookup table from matching entries not included in the subset of the second lookup table if a corresponding lookup in the first lookup table matches the at least one entry in the first lookup table.

35. The computer readable non-transitory storage medium of claim 34, wherein the program instructions are further executable to:
  allocate a single entry in the first lookup table for each shortest-path multicast tree.

36. The computer readable non-transitory storage medium of claim 34, wherein the program instructions are further executable to:

allocate a first entry and a second entry in the first lookup table for each shared multicast tree, wherein
the first entry matches a source address having a global scope, and
the second entry matches a source address having a non-global scope.

37. The computer readable non-transitory storage medium of claim 36, wherein the program instructions are further executable to:
allocate a plurality of entries in the second lookup table for each shared multicast tree, wherein
each of the entries corresponds to a respective one of a plurality of scopes, and
each of the entries only identifies output interfaces included in a zone of the respective one of the plurality of scopes.

38. The computer readable non-transitory storage medium of claim 34, wherein the program instructions are further executable to:
configure the lookup restriction unit by storing a mask in a mask table, wherein a key generated using the mask will only match entries comprised in the subset of the second lookup table.

39. The computer readable non-transitory storage medium of claim 34, wherein the program instructions are further executable to:
access the first lookup table based on a first portion of a packet header of a multicast packet, wherein
the first lookup table identifies the subset of the second lookup table, and
the first portion of the packet header comprises at least a first part of a multicast group destination address; and
access the subset of the second lookup table based on a second portion of the packet header, wherein
the second portion of the packet header comprises at least a second part of the multicast group destination address.

40. The computer readable non-transitory storage medium of claim 39, wherein the program instructions are further executable to:
provide a key to the second lookup table, wherein
the key is generated based on an ID of a RPF (Reverse Path Forwarding) interface, and
the RPF interface received a packet in which the packet header was comprised.

41. A system comprising:
network interface means for receiving a packet header via a network link;
means for accessing a first lookup table based on a first portion of the packet header, wherein
the first portion of the packet header comprises at least a first part of a multicast group destination address,
the first lookup table identifies a subset of a second lookup table,
the subset of the second lookup table comprises at least one entry; and
means for accessing the subset of the second lookup table based on a second portion of the packet header, wherein
the second portion of the packet header comprises at least a second part of the multicast group destination address.

42. The system of claim 41, wherein
the second lookup table identifies at least one output interface via which a packet comprising the packet header should be output.

43. The system of claim 42, wherein
the subset of the second lookup table corresponds to one of a plurality of scopes.

44. The system of claim 43, wherein
the subset of the second lookup table corresponds to a link-local scope of the scopes if a scope of the multicast group destination address is link-local;
the subset of the second lookup table corresponds to a site-local scope of the scopes if the scope of the multicast group destination address is site-local; and
the subset of the second lookup table corresponds to a global scope of the scopes if the scope of the multicast group destination address is global.

45. The system of claim 44, wherein
if a scope of a source address comprised in the packet header is less than the scope of the multicast group destination address, each entry comprised in the subset of the second lookup table identifies only output interfaces associated with one of a plurality of zones, and
a scope of the one of the zones is equal to the scope of the source address.

46. The system of claim 42, wherein
the subset of the second lookup table corresponds to a shortest-path multicast tree if a match for the source address is found in the first lookup table; and
the subset of the second lookup table corresponds to a shared multicast tree if no match for the source address is found in the first lookup table.

47. The system of claim 42, wherein
the means for accessing the subset of the second lookup table provide a key to the second lookup table, wherein
the key comprises an ID of a RPF (Reverse Path Forwarding) interface, and
the RPF interface received a packet in which the packet header was comprised.

48. The system of claim 42, wherein the first lookup table identifies the subset of the second lookup table by identifying a mask, wherein
a key generated using the mask only matches entries comprised in the subset of the second lookup table.

49. The system of claim 48, further comprising:
means for applying the mask to a multicast group destination address and an interface ID, wherein
the multicast group destination address is comprised in the packet header, and
the interface ID identifies an input interface that received a packet comprising the packet header.

50. The system of claim 49, wherein
the packet header comprises a source address;
the mask selects a portion of the source address identifying a scope of the source address if the source address has a non-global scope;
the mask does not select any of the source address if the source address has a global scope.

51. The system of claim 50, wherein
the mask selects all of the source address if the accessing the first lookup table comprised matching an entry, which corresponds to a shortest-path multicast tree, in the first lookup table.

52. The system of claim 42, further comprising
means for applying the mask to the second portion of the packet header to produce a masked second portion; and
means for generating a hash based on the masked second portion, wherein
accessing the second lookup table dependent on the second portion of the packet header comprises:

providing a key comprising the hash to the second lookup table.

53. The system of claim 42, further comprising:

means for allocating a single entry in the first lookup table for each shortest-path multicast tree.

54. The system of claim 53, further comprising:

means for allocating a first entry and a second entry in the first lookup table for each shared multicast tree, wherein the first entry matches a source address having a global scope, and the second entry matches a source address having a non-global scope.

55. The system of claim 54, further comprising:

means for allocating a plurality of entries in the second lookup table for each shared multicast tree, wherein each of the entries corresponds to a respective one of a plurality of scopes, and each of the entries only identifies output interfaces included in a zone of the respective one of the plurality of scopes.

* * * * *